(12) United States Patent
Wang et al.

(10) Patent No.: US 7,650,516 B2
(45) Date of Patent: Jan. 19, 2010

(54) FILE DISPLAY SYSTEM AND METHOD THEREOF

(75) Inventors: Han-Che Wang, Guangdong (CN);
Chun-Wei Pan, Guangdong (CN);
Kuan-Hong Hsieh, Guangdong (CN);
Hua-Dong Cheng, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 524 days.

(21) Appl. No.: 11/309,911

(22) Filed: Oct. 27, 2006

(65) Prior Publication Data
US 2007/0136507 A1    Jun. 14, 2007

(30) Foreign Application Priority Data
Nov. 4, 2005    (CN)    ......................... 2005 1 0101034

(51) Int. Cl.
*G06F 1/00*    (2006.01)
*G06F 17/00*   (2006.01)
*G09G 5/00*    (2006.01)

(52) U.S. Cl. ..................... 713/300; 715/200; 345/204
(58) Field of Classification Search ................... 713/300
See application file for complete search history.

(56) References Cited

U.S. PATENT DOCUMENTS

| | | | |
|---|---|---|---|
| 3,810,107 A * | 5/1974 | Goldman et al. ............ 715/235 |
| 4,495,490 A * | 1/1985 | Hopper et al. .............. 345/469 |
| 5,367,623 A * | 11/1994 | Iwai et al. .................... 715/776 |
| 5,801,713 A * | 9/1998 | Endo et al. ................... 345/473 |
| 6,037,954 A | 3/2000 | McMahon |
| 6,441,811 B1 * | 8/2002 | Sawada et al. .............. 345/204 |
| 6,493,734 B1 | 12/2002 | Sachs et al. |
| 6,877,135 B1 | 4/2005 | Kamiwada |
| 7,057,591 B1 | 6/2006 | Hautanen et al. |
| 7,401,286 B1 * | 7/2008 | Hendricks et al. ........... 715/203 |

FOREIGN PATENT DOCUMENTS

| JP | 08044326 A * | 2/1996 |
|---|---|---|
| TW | 569109 | 1/2004 |
| TW | 1234717 | 6/2005 |

* cited by examiner

*Primary Examiner*—Suresh K Suryawanshi
(74) *Attorney, Agent, or Firm*—Winston Hsu

(57) ABSTRACT

A file display system is provided. The file display system includes a MCU (10), a display control unit (20) and a display unit (30). The MCU receives power-on commands and power-off commands from a control unit (50). According to the preferred embodiment, upon receiving a power-off command, the MCU reads a next page data content of a currently displayed page from a storage apparatus (40) and stores the next page data content in the display control unit; and upon receiving a following power-on command, the MCU enables the display control unit, and the display control unit controls the next page data content stored therein to be displayed on the display unit, the next page data content therefore becomes a currently displayed page. A related method is also provided.

6 Claims, 3 Drawing Sheets

FILE DISPLAY SYSTEM AND METHOD THEREOF

TECHNICAL FIELD

The present invention relates to file display systems and methods thereof, and particularly to a file display system and a related method thereof which can quickly display files once the file display system has been booted up.

RELATED ART

A file display system (e.g., a reading apparatus) typically executes tasks in accordance with commands inputted by users. After a user powers on a file display system, the user must wait until the file display system finishes booting up before the user is able to enter commands via an input tool to find his or her object. Hence, the user must wait and search which is an inefficient and time consuming procedure before he or she can browse and locate the object.

Further, if the user wants to resume a previous file browsing after the file display system is shut down and subsequently rebooted, he or she must re-enter the commands, re-search and find the previous file before the previous shut down, which will unduly waste the user' time.

Therefore, there is a need for providing a file display system which can solve the above-mentioned problem.

SUMMARY

A file display system is provided in accordance with a preferred embodiment. The file display system includes a microcontroller unit (MCU), a display control unit and a display unit. The MCU receives a power-on command or a power-off command from a control unit. According to the preferred embodiment, upon receiving a power-off command, the MCU reads a next page data content of a currently displayed page from a storage apparatus and stores the next page data content in the display control unit; and upon receiving a following power-on command, the MCU enables the display control unit, which in turn controls the next page data content stored therein to be displayed on the display unit, the next page data content therefore becomes a currently displayed page.

A file display method executed by the file display system described above is also provided. The method comprising the steps of: (a) receiving a power-off command; (b) reading a next page data content of a currently displayed page from a storage apparatus to the display control unit; (c) shutting off the file display system; (d) receiving a power-on command; and (e) enabling the display control system to control the next page data content stored therein to be displayed on the display unit, the next page data content therefore becoming a currently displayed page.

Other advantages and novel features will be drawn from the following detailed description with reference to the attached drawings, in which:

BRIEF DESCRIPTION OF THE DRAWINGS

FIGS. 2 and 3 together depict a flowchart of a method for displaying files executed by the system of FIG. 1 in accordance with another preferred embodiment of the present invention, wherein FIG. 2 depicts a flowchart of a procedure executed during the system of FIG. 1 shuts down, and FIG. 3 depicts a flowchart of a procedure executed during the system of FIG. 1 is successively re-booted up.

DETAILED DESCRIPTION OF THE EMBODIMENTS

Figure 1:
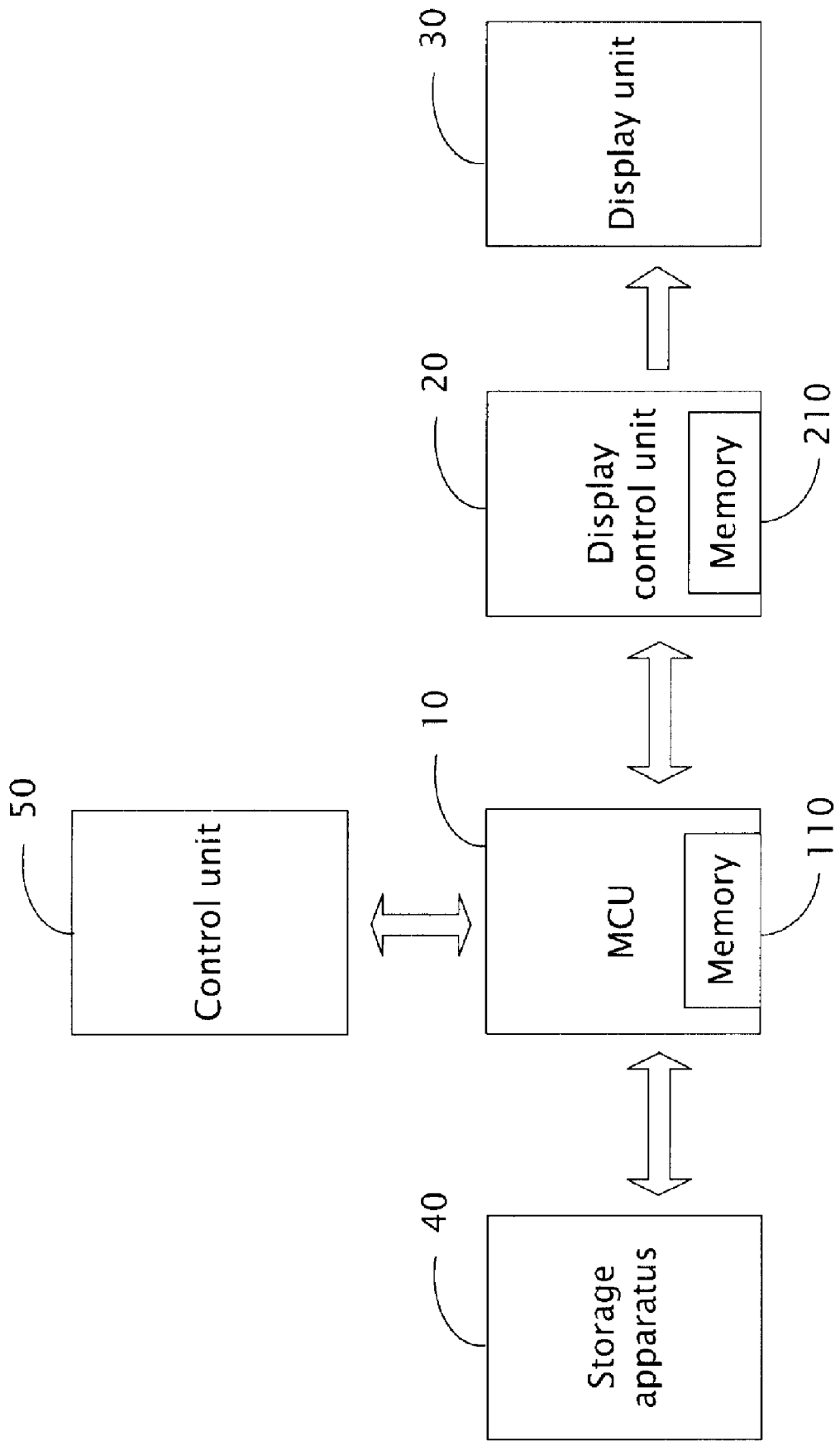
FIG. 1 depicts an exemplary block diagram of a file display system in accordance with a preferred embodiment of the present invention.

Referring to FIG. 1, an exemplary block diagram of a file display system is shown. The system mainly includes a microcontroller unit (MCU) 10, a display control unit 20, a display unit 30, a storage apparatus 40, and a control unit 50. The storage apparatus 40 can be a memory card or the like which stores a plurality of files. The MCU 10 reads the files from the storage apparatus 40, stores the files in an MCU built-in memory 110 or directly transmits the files to the display control unit 20. The display control unit 20 receives the files from the MCU 10, stores the files in a display unit embedded memory 210 or directly controls the display unit 30 to display the files.

The control unit 50 is connected with an input tool (not shown). The input tool enables users to enter commands. These commands include but are not limited to power-on/off commands and page-up/down commands. The control unit 50 converts the commands into machine instructions readable by the MCU 10 and transmits the machine instruction to the MCU 10. The MCU 10 identifies the commands according to the machine instructions and executes corresponding procedures. For example, upon receiving the power-on command, the MCU 10 initializes itself and enables the display control unit 20.

Upon receiving the page-down command, the MCU 10 reads a next page data content of a currently displayed page from the storage apparatus 40, and transmits the next page data content to the display control unit 20. The display control unit 20 then displays the next page data content on the display unit 30 and the next page data content therefore becomes the currently displayed page. Likewise, upon receiving the page-up command, the MCU 10 reads a previous page data content of the currently displayed page to the display control unit 20. The display control unit 20 displays the previous page data content on the display unit 30 and therefore the previous page data content becomes the currently displayed page.

Upon receiving the power-off command, the MCU 10 saves parameters and prepares for the shut down. At the same time, the MCU 10 also reads the next page data content of the currently displayed page from the storage apparatus 40, and transmits the next page data content to the display control unit 20. The display control unit 20 then stores the next page data content in the display unit embedded memory 210. Hence, during a following re-booting up sequence, the MCU 10 enables the display control unit 20 and timely displays the next page data content.

As described above, the MCU 10 may read the next page data content or the previous page data content of the currently displayed page from the storage apparatus 40 in accordance with the page-down command or the page-up command. The MCU 10 may also pre-read and store the next page data content or the previous page data content of the currently displayed page from the storage apparatus 40 to the MCU built-in memory 110 without receiving the page-down command and the page-up command.

In one manner, the MCU 10 consistently pre-reads and stores the next page data content from the storage apparatus 40 to the MCU built-in memory 110. In an alternative manner, the MCU analyzes a flipping intention of the users according to one or more immediate previous flips, and then pre-reads and stores the next page data content or the previous page data content from the storage apparatus 40 to the MCU built-in memory 110.

For example, if the one or more immediate previous flips are page-downs, the MCU 10 pre-reads and stores the next page data content of the currently displayed page to the MCU built-in memory 110. Otherwise, if the one or more immediate previous flips are page-ups, the MCU 10 pre-reads and stores the previous page data content of the currently displayed page to the MCU built-in memory 110.

Hence, after the next page data content or the previous page data content has been stored in the MCU built-in memory 110, if a page-down command or a page-up command is received, the MCU 10 analyzes whether the page-down command or the page-up command accords with the next page data content or the previous page data content stored in the MCU built-in memory 110. If yes, the MCU 10 transmits the next page data content or the previous page data content to the display control unit 20. If not, the MCU 10 re-reads a previous page data content or a next page data content from the storage apparatus 40 and transmits the re-read previous page data content or the re-read next page data content to the display control unit 20.

For example, if the next page data content has been stored in the MCU built-in memory 110 and a page-down command is received, the MCU 10 transmits the next page data content stored in the MCU built-in memory 110 to the display control unit 20; however, if the next page data content has been stored in the MCU built-in memory 110 but a page-up command is received, the MCU 10 re-reads the previous page data content from the storage apparatus 40 and transmits the previous page data content to the display control unit 20. Similarly, if the previous page data content has been stored in the MCU built-in memory 110 and a page-up command is received, the MCU 10 transmits the previous page data content from the MCU built-in memory 110 to the display control unit 20; however, if the previous page data content has been stored in the MCU built-in memory 110 but a page-down command is received, the MCU 10 re-reads the next page data content from the storage apparatus 40 and transmits the previous page data content to the display control unit 20.

Figure 2:
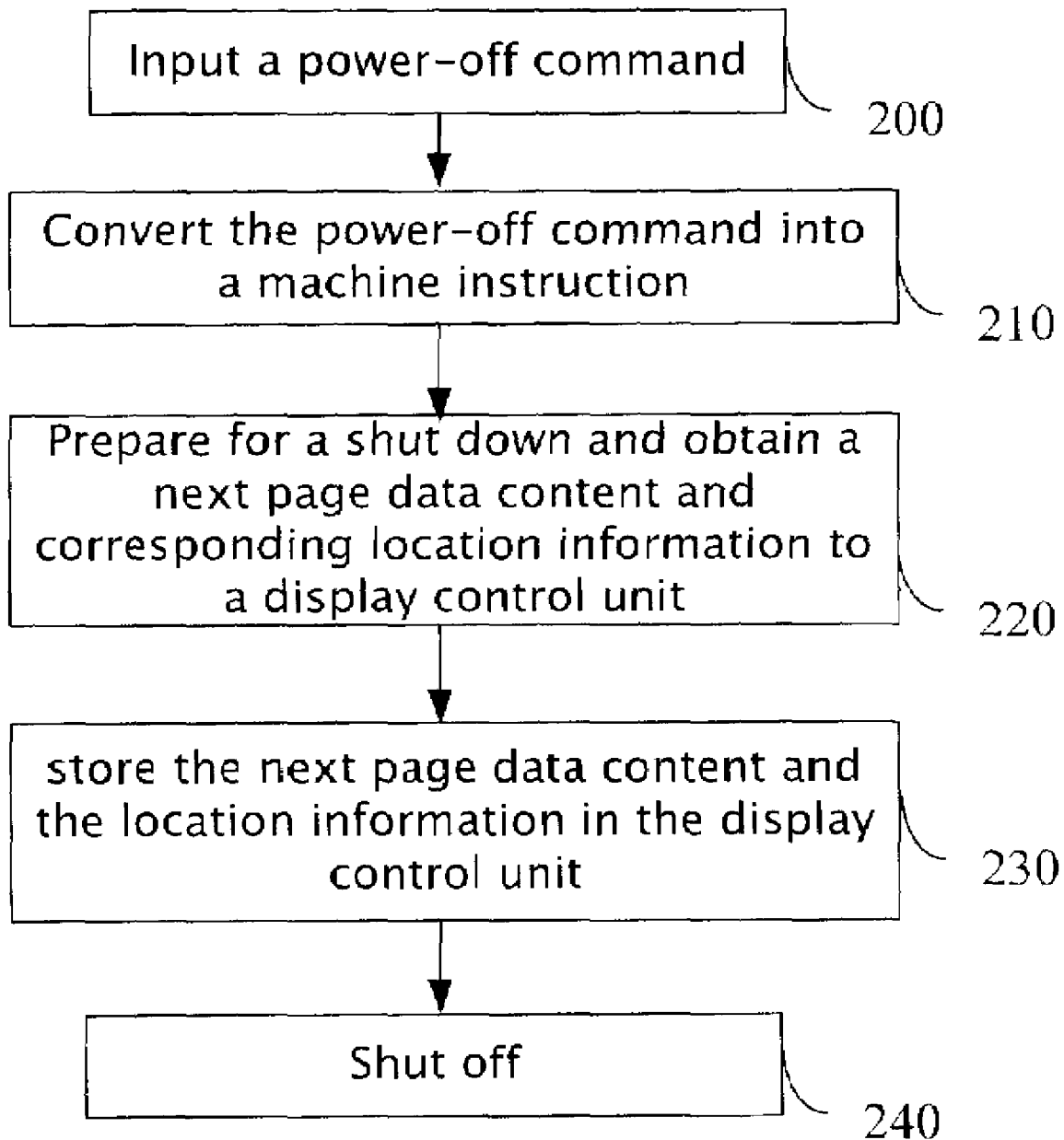

Referring to FIG. 2, a flowchart of a procedure executed by the file display system during shutting down is shown. The procedure begins when a user inputs a power-off command via the input tool (step S200). The control unit 50 converts the power-off command into the machine instruction for the MCU 10 and transmits the machine instruction to the MCU 10 (step S210). The MCU 10 receives the machine instruction and prepares for a shut down according to the machine instruction, the preparation includes reading the next page data content of the currently displayed page from the storage apparatus 40 and transmitting the next page data content and corresponding location information on the next page data content in the storage apparatus 40 to the display control unit 20 (step S220). The display control unit 20 then stores the next page data content and the location information in the display unit embedded memory 210 (step S230), and the MCU 10 shuts off (step S240). The procedure is finished.

Figure 3:
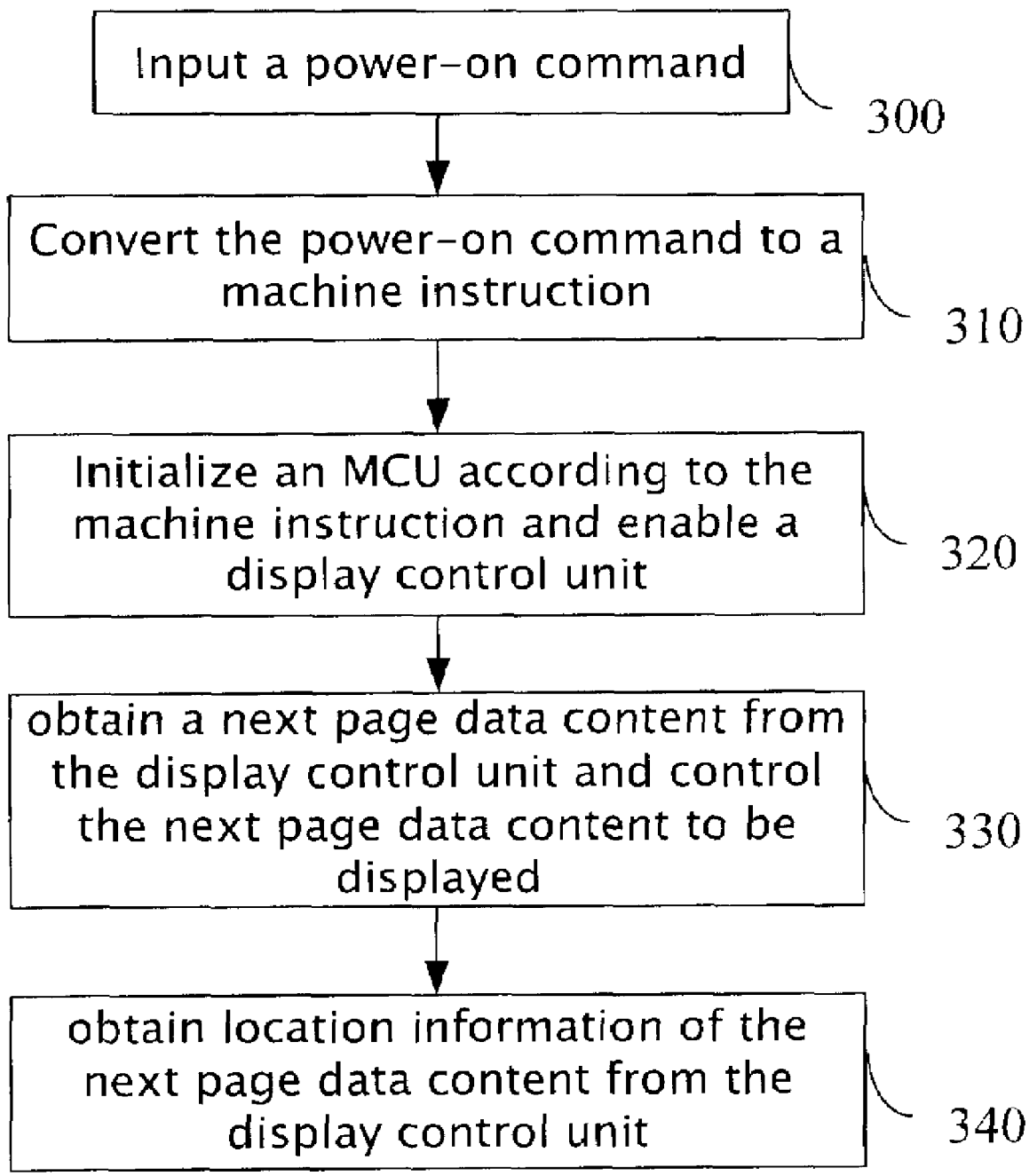

Referring to FIG. 3, a flowchart of a procedure executed by the file display system during a following re-booting up is shown. First, the user inputs a power-on command via the input tool (step S300). The power-on command is converted by the control unit 50 to the machine instruction for the MCU 10 and transmitted to the MCU 10 (step S310). The MCU 10 initializes itself according to the readable instruction and enables the display control unit 20 (step S320). The display control unit 20 obtains the next page data content from the display unit embedded memory 210 and displays the next page data content on the display unit 30, the next page data content therefore become the currently displayed page (step S330). The MCU 10 obtains the location information of the currently displayed page from the display unit embedded memory 210 (step S340). The location information enables the users to flip pages from the currently displayed page. The procedure is then finished.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A file display system comprising a microcontroller unit (MCU), a display control unit and a display unit, the MCU receiving power-on commands and power-off commands from a control unit, wherein:

upon receiving a power-off command, the MCU reads a next page data content of a currently displayed page from a storage apparatus and stores the next page data content in the display control unit; and upon receiving a following power-on command, the MCU enables the display control unit, and the display control unit controls the next page data content stored therein to be displayed on the display unit, the next page data content therefore becomes a currently displayed page.

2. The file display system as claimed in claim 1, wherein the MCU further stores location information of the next page data content in the storage apparatus in the display control unit upon receiving the power-off command.

3. The file display system as claimed in claim 2, wherein the MCU further obtains the location information on the next page data content from the display control unit, the location information enabling the MCU to flip pages from said currently displayed page.

4. A file display method executed by a file display system comprising a microcontroller unit (MCU), a display controller and a display unit, the method comprising the steps of:

receiving a power-off command;

reading a next page data content of a currently displayed page from a storage apparatus to the display control unit;

shutting off the file display system;

receiving a power-on command; and enabling the display control system to control the next page data content stored therein to be displayed on the display unit, the next page data content therefore becoming a currently displayed page.

5. The method as claimed in claim 4, further comprising the step of storing location information on the next page data content in the storage apparatus to the display control unit.

6. The method as claimed in claim 5, further comprising the step of obtaining the location information on the next page data content from the display control unit, the location information enabling the MCU to flip pages from said currently displayed page.

* * * * *

UNITED STATES PATENT AND TRADEMARK OFFICE
CERTIFICATE OF CORRECTION

PATENT NO. : 7,650,516 B2  Page 1 of 1
APPLICATION NO. : 11/309911
DATED : January 19, 2010
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Twenty-third Day of November, 2010

David J. Kappos
*Director of the United States Patent and Trademark Office*